Patented May 10, 1949

2,470,010

UNITED STATES PATENT OFFICE 2,470,010

MELTING IRON IN ELECTRIC FURNACES

Sidney D. Williams, Warren, Ohio

No Drawing. Application June 17, 1946,
Serial No. 677,412

5 Claims. (Cl. 75—12)

This invention relates to a new and improved method of making steel from waste materials, and particularly to a method of making high quality steel in an electric furnace from materials consisting largely of steel turnings, cast iron borings, and iron oxides which would normally be discarded as waste.

The problem of finding an economical method of reclaiming or salvaging the increasingly large quantities of turnings, especially alloy steel turnings, mixed turnings and borings, cast iron borings, and iron oxides such as scale and scarfings has long perplexed the steel industry. It has heretofore been suggested that alloy-free turnings and borings and alloy-free scale and scarfings may in certain instances be introduced into blast furnace charges. Alloy-containing steel turnings, cast iron borings, scale and scarfings, however, are usually considered to be undesirable ingredients of such charges because the pig iron resulting will contain undesirable alloying elements. Moreover the processing of alloy-containing steel turnings, cast iron borings, scale and scarfings in blast furnaces results in the loss of valuable alloys. Some such scrap material has also been used directly in electric furnaces for the production of high quality steel, but these attempts have not been successful commercially, resulting in reduced production and causing the product to be of generally inferior quality. Consequently it has not been economically feasible to dispose of waste turnings and borings in any direct electric furnace steel making process, and this process as most commonly practiced heretofore has been based on the use of clean but expensive metallic charges of solid steel scrap.

An additional problem which has always been present in the electric furnace steel making art is the high cost of melting the raw materials of the charge, whether these be selected steel scrap, light steel turnings, shavings, or borings. When large quantities of these scrap materials are to be melted the cost of doing so becomes prohibitive. Thus, the industry has long realized the desirability, from the standpoint of economy, of using a molten charge which has previously been melted by less costly melting methods. One method of producing electric furnace steel at relatively low cost, which is widely used in Europe, consists in preparing cupola metal from miscellaneous scrap in the usual manner and reducing the carbon content of the cupola metal by prolonged blowing in a basic lined Bessemer converter prior to placing the molten charge in the electric furnace. In another method widely used in America and elsewhere steel is made in relatively small quantities, mainly for high grade castings, by melting a charge of carefully selected iron and steel scrap in a cupola, transferring the molten cupola metal to a Bessemer converter where the carbon is removed by blowing, and then transferring the metal to an electric furnace for finishing. That these processes are costly to practice is obvious, each involving the use of a Bessemer converter for blowing carbon from cupola metal, and in each expensive ferro-silicon must be added to the cupola charge to supply heat for the blow in the Bessemer converter if steel is used in any appreciable amount in the cupola charge. If ferro-silicon or the like is not used, special means must be employed to heat the cupola metal prior to blowing in the Bessemer converter and this introduces an expensive additional step. Finally, the yield of metal is greatly reduced whenever it is necessary to use the Bessemer converter in an intermediate operation.

In order to obtain good grades of steel at reasonable cost by means of the electric furnace, it has been suggested that molten direct cupola metal, produced at low cost from cheap metallic scrap and melted in a cupola by means of coke, be directly introduced into the electric furnace. Until my invention, however, no one has found a satisfactory way of using large proportions of molten direct cupola metal in a charge for making quality steel in an electric furnace.

One of the principal objects of my invention is to utilize the large quantities of relatively inexpensive steel turnings, mixed turnings and borings, cast iron borings, scale, and scarfings in an economical and commercially feasible process for manufacturing high quality steel.

Another object of my invention is to use large quantities of alloy steel turnings, and alloy-containing scale and scarfings in the preparation of high quality steel without wasting any of the valuable alloying elements.

A further important object of my invention is to provide a method which permits the introduction of a high percentage of direct cupola metal into an electric furnace.

A still further object of my invention is to provide a safe and economical process for removing carbon from molten cupola metal in an electric furnace.

Steel can be and frequently is manufactured today in the open hearth furnace by a process which includes the initial step of placing iron ore in its original state, or in the form of small briquettes, on the bottom of the furnace and then pouring in molten pig iron. Whether the ore is briquetted or not, however, the reaction is extremely violent and frequently causes the metal to boil out of the furnace. When the same process is tried in the electric furnace, very unsatisfactory results are obtained. A modification of the foregoing process for the electric furnace was suggested in the United States patent to Wales No. 987,840, issued March 28, 1911. In the process set forth in this patent lime and iron oxide and, if desired, a proportion of steel scrap, is placed on the hearth of a modified electric furnace and the charge heated with a gas flame until it approaches the melting point. The flame is then discontinued and a charge of molten pig iron is poured over the oxide. As in the previous method, however, a violent reaction occurs and the process has been found to be unsatisfactory for large scale use.

To overcome the serious objections to the processes of the prior art and to achieve the aforementioned objects, I have originated a process for making quality steel from inexpensive alloy-bearing materials which permits the recovery of the alloy values and results in maximum production at a minimum cost. In its preferred embodiment, my invention consists in compressing into a very large, highly heated mass, or briquette, a large quantity of alloy steel turnings and borings, or the like, iron oxide being distributed through the mass, placing said substantially self-sustaining, heated mass in an electric furnace, and adding thereto molten cupola metal prepared from a quantity of alloy steel turnings and borings or the like roughly equal in weight to that of the self-sustaining, heated mass.

By using alloy-containing steel turnings, borings and similar scrap in the preparation of both the briquette and the molten cupola metal, the entire charge of the furnace consists of the most inexpensive materials available for the production of high quality alloy steel. A supply of low cost alloy-containing materials, such as turnings and borings, scale, scarfings, and pit scrap, will, under normal conditions, always be available. And because of the inability of blast furnaces and open hearth furnaces, which make the ordinary grades of steel, to use such alloy-bearing materials, they will continue to be a source of cheap raw material.

In practicing my invention I first prepare a large mass or briquette of steel turnings, and other scrap materials by charging into the upper end of a conventional gas-fired, inclined, rotary kiln the desired quantity of steel turnings, with or without cast iron borings, and iron oxide in the form of scale, scarfings, or low silica iron ore. Sufficient iron oxide is preferably charged into the upper end of the kiln or mixed with the heated scrap as it is discharged from the kiln so that the oxide will react with carbon in the cupola metal subsequently added and thereby reduce the carbon content of the resultant bath to the extent desired. The amount of oxide required will, of course, depend largely on the carbon content of the cupola metal. When the cupola metal is prepared as hereinafter described, it will generally contain about three per cent carbon. For any desired result, the amount of oxide to be added can be accurately determined by computations.

While the turnings and oxide pass through the kiln they are uniformly mixed and heated to a temperature of from 1500° F. to 2400° F. A reducing atmosphere is maintained within the kiln so that oxidation of the turnings and borings is kept to a minimum. During this heating operation the sulfur containing cutting oils and other objectionable matter contaminating the charge are driven off and the turnings lose their springy character and most of their tensile strength. Upon reaching the lower or discharge end of the rotary kiln, the intimately mixed turnings and oxide drop directly and continuously into a large brick-lined bucket which is preferably frusto-conical, with its larger end lowermost. The upward taper is preferably uniform and sufficiently great to permit the ready discharge of a briquette when the bottom of the bucket is removed. At intervals, during the bucket charging process, a heavy weight adjustably suspended above the bucket is dropped to compress the clean, hot turnings and oxide into a compact, relatively dense briquette of from twenty to one hundred tons in weight, depending on the capacity of the electric or other melting furnace to be used. The size of the briquette is regulated so as to form approximately 35% to 65% of the capacity of the furnace when cupola metal is to be used as the remainder of the charge in the electric furnace.

Instead of using a heavy weight to compress the mass, a specially designated press can be used to compress the clean, hot turnings and oxide into a very large, compact briquette having a very high density. Whether a weight or press is used, however, the material is compressed to such a degree that the briquette when removed from the bucket substantially maintains its shape and at the same time is not so dense as to prevent molten metal from penetrating into the interior thereof.

While the briquette is being formed it is very important to have the lower end of the bucket completely sealed with sand, limestone, or other suitable material to prevent air from entering and rising through the mass because of a chimney effect in which case the highly heated turnings would be rapidly oxidized. If the briquette is not placed in a furnace as soon as completed, a cover is placed on the top of the bucket and this cover, as well as the bottom tray, is sealed with sand or other suitable material to prevent the entrance of air.

In some instances it may be desirable to place a minor proportion of solid intermill scrap or pit scrap on the bottom of the bucket and the hot turnings and iron oxide fed on top until a briquette of the desired size is obtained.

After the large heated briquette has been placed in the melting furnace, molten direct cupola metal is poured over the briquette and forms the balance of the furnace charge. This cupola metal is prepared substantially from the same alloy scrap and similar materials as was the briquette and, in addition to lowering the melting cost for the electric furnace, provides further substantial savings by utilizing inexpensive alloy-containing scrap which is generally less expensive than uncontaminated scrap. Moreover, it is highly desirable that the cupola metal have initially a low metalloid content, and since steel turnings and cast iron borings have relatively small percentage of the objectionable metalloids, these scrap materials are excellent source materials for the cupola metal both from the metallurgical and economical standpoint.

The cupola metal is prepared by forming the unprocessed alloy-contaminated scrap materials into small briquettes in the usual manner and melting them in a standard cupola furnace. The charge may consist of varying proportions of briquetted steel turnings, cast iron borings and mixed turnings and borings, plus small proportions of solid low grade cast iron and pit scrap. The amount of scrap charged into the cupola is regulated so that the resulting cupola metal will contain approximately 0.7 per cent silicon. A very satisfactory charge for the cupola consists of approximately 30 per cent briquetted cast iron borings, 30 per cent briquetted mixed borings and turnings, 20 per cent briquetted turnings, 10 per cent solid low grade cast iron scrap and 10 per cent pit scrap. The cupola metal may also be prepared by melting a charge consisting of 20 per cent briquetted cast iron borings and 80 per cent briquetted mixed borings and turnings.

It has been found desirable to add about 4 per cent ground carbonaceous material with a small quantity of barium carbonate, potassium cyanide or an equivalent catalyst to the briquettes of turnings and mixed turnings and borings in order to lower the melting points of these briquettes. When a briquette consisting entirely of turnings is charged into a cupola furnace melting occurs much less rapidly than in the case where the charge comprises a body of cast iron of the same size. By uniformly mixing approximately 4 per cent carbonaceous material and a small quantity of barium carbonate throughout the briquettes of turnings and mixed turnings and borings, briquettes are obtained which melt almost as readily as a body of cast iron of the same size because of a lowering of the melting point resulting from the cementation process which starts when the temperature of the briquettes reach 1500° F. to 1600° F. Before the melting temperature of low carbon steel is reached (about 2650° F.), a very considerable amount of carbon, through the medium of the carbonaceous gases which form, is cemented into the turnings and the melting point is lowered to around 2200° F. so that the turnings melt more readily.

The cupola metal is tapped continuously into a holding vessel or mixer which may be fuel-fired. As molten cupola metal is required for charging an electric furnace, it is poured from the holding vessel or mixer into a basic lined transfer ladle. Desulphurizing of the cupola metal is effected in the transfer ladle by means of soda-ash in the usual manner. The sulphur-containing slag is skimmed off and the metal is ready to be transferred to the electric furnace. The silicon content of the cupola metal will be reduced during the desulphurizing operation from approximately 0.70 per cent to approximately 0.50 per cent.

As soon as the electric furnace is ready to receive its charge, the bucket containing the large, highly heated briquette of steel turnings and intimately mixed iron oxide is lowered into the furnace which must be of the removable roof type to facilitate this operation. In order to protect the furnace from objectionable shock and possible damage which might result when the large briquette is discharged from the bucket; I have found it desirable to place a small cushioning charge on the floor of the furnace prior to introducing the large briquette. For a briquette of approximately 50 tons, a charge of approximately 3000 to 5000 pounds of limestone or burnt lime is first placed in a small charging bucket and about 8000 pounds of crushed, de-oiled turnings are added. The contents of the bell-bucket is then discharged onto the furnace floor where it forms a small but very satisfactory cushion for the large briquette.

While the highly heated briquette of steel turnings and intimately mixed iron oxide is being melted down by the combined heats of the electric arcs and the molten cupola metal, the carbon content of the cupola metal which is roughly 3 per cent is being reduced to approximately 1.5 per cent by a simple dilution. The further reduction of the carbon in the molten charge to any desired carbon content is accomplished by means of oxidation reaction between the carbon and the highly heated and uniformly distributed iron oxide in the large briquette. Since this reaction is completed only above approximately 2450° F., it is an important feature of my invention to raise the temperature of the melt quickly so that there is no appreciable delay before the endothermic reaction between the iron oxide and the carbon in the cupola metal takes place.

When the process of the present invention is employed, the solid scrap is melted more rapidly and the temperature of the entire melt raised more quickly to the degree necessary for the decarburizing reaction to take place than in any previously known process. These improvements result partially from the utilizing in a single process a charge consisting in part of a mass of very highly heated solid material and the remainder of the charge consisting of a mass of molten metal. The fact that there is a pool of relatively low melting point metal immediately available at the bottom of the furnace greatly increases the efficiency of the melting process. Except for the amount of scrap within the electric circle, most of the melting in an electric furnace takes place at the bottom. Thus, a pool of molten metal must ordinarily be formed at the bottom of the furnace before melting will proceed rapidly. If low carbon cold steel scrap alone is charged into an electric furnace, the low carbon scrap must first be heated to approximately 2700° F. before there is formed a pool of metal into which the surrounding scrap may fall and melt. When the electric furnace is charged with two-thirds or one-half hot scrap in the form of a briquette, and there is immediately added a quantity of direct cupola metal equal to one-third or one-half of the total charge, a pool of molten metal of higher carbon content and therefore lower melting point is formed than is the case when low carbon steel scrap alone is melted. Because of the presence of this cupola metal pool a melting bath having a temperature of approximately 2300° F. is formed or, in other words, a pool is formed which has a melting temperature about 400° F. lower than when the bath is formed entirely of low carbon steel scrap. As the melting proceeds, the carbon content of the solid steel scrap will be raised and its melting point lowered, while the carbon content of the cupola metal is being reduced by dilution and by the reaction of its carbon with iron oxide. It should be evident that melting will proceed much more rapidly and reduction of the mass of solid metal to molten form will be accomplished most rapidly when there is immediately available at the bottom of the furnace a pool of low melting point metal into which the highly heated low carbon steel scrap may settle.

In addition to providing a melting pool immediately available for the solid scrap, the molten cupola metal provides a means for absorbing the heat of the electric furnace more rapidly and completely than would occur if solid scrap alone were employed. This increased thermal efficiency results in the raising of the temperature of the pool more rapidly to compensate for the increasingly higher melting point of the pool as its carbon content is reduced by dilution with molten low carbon scrap and by the reaction between the carbon and iron oxide. As a result of this improved practice, the solid charge is melted much more rapidly and carbon is removed from the cupola metal in a much shorter and simpler operation with great savings in power consumption, both in total energy used in kilovolt ampere demand, and the overall production of each furnace is enormously increased.

Heretofore, when an attempt was made to charge an electric furnace with 50 per cent cold solid steel scrap and iron oxide on the bottom of the furnace and then pouring in a 50 per cent charge of molten cupola metal, much additional time and current was required to heat the mass before the reaction starts, the charge usually foamed, causing more delay, and furthermore the reaction was not complete. When my process is followed, however, the reaction between the carbon in the cupola metal and the iron oxide takes place uniformly, and quickly but without foaming and without a violent and unmanageable reaction. By using a very large, highly heated briquette with iron oxide distributed throughout, there is such a surface area exposed and reactants present at all times as to produce a rate of reaction which precludes the foaming that results when the teachings of the prior art are followed.

After the large briquette of steel turnings has been melted down and the decarbonizing operation between the iron oxide and the cupola metal substantially completed, the charge is either finished under a single slag or the first slag is drawn off and a second slag made and the charge tapped under a carbide slag as is customary in standard double slag electric furnace practice.

In a slight modification of my process, I form the large briquette just as previously described, but incorporate in it only low phosphorous turnings or steel scrap and clean iron scale or scarfings. No cast iron borings are included. The cupola metal, prepared as already described, is desulphurized in a basic lined ladle with soda-ash and slag containing the sulphur is drawn off. The metal is then dumped into another basic lined ladle on the bottom of which has been placed a mixture of a reaction accelerator like sodium nitrate, clean iron scale and lime in the proper proportions. To get a more complete reaction the mixture is dumped from the second ladle into the first ladle. This operation will remove most or all of the silicon, most of the phosphorus and some manganese and carbon. The basic slag containing the silicates and phosphates is skimmed off and the partially refined cupola metal dumped into the electric furnace on top of the large briquette just previously placed in the furnace. To this melted charge in the electric furnace is then added the requisite amount of manganese ore to raise the manganese content of the metal to the desired point and the charge heated without skimming off the basic slag. A carbide slag is finally made and the charge finished in the regular way.

This modification of my process enables me to obtain the desired very high manganese content in a low carbon steel without the use of very expensive low carbon ferro-manganese. It is, of course, possible to use this process to obtain other desirable alloy steels by adding the appropriate ore directly to the melt rather than adding the more costly ferro-alloy.

Where it is temporarily impossible to employ cupola metal in the melting furnace with the large briquette as when the cupola furnaces have not been put into operation, large quantities of alloy scrap can be utilized by forming a very large, dense, highly heated briquette entirely of scrap material and introducing this briquette into a melting furnace without the addition of molten cupola metal. The scrap material processed in this manner is fed into a rotary kiln just as previously described and a sufficient amount of carbonaceous matter is added as the refining material. The highly heated mixture of scrap and carbon is discharged directly into a brick-lined bucket such as that previously described and compressed into a large, very dense briquette. Since the solid scrap and carbon comprises substantially the entire charge of the furnace, a mass of about 20 to 100 tons is formed into a substantially self-sustaining briquette depending on the size of the furnace. This briquette may then be charged directly into the furnace in three or four minutes. As before, however, if the briquette is not charged into the furnace immediately, it should be placed in a compartment sealed from air and insulated against any appreciable loss of heat until used. After placing the briquette in the furnace and the electrodes lowered, the briquette is completely melted within a very short time, and, the refining process takes place very rapidly with a minimum expenditure of current.

The charge for the latter process can be made up entirely of turnings and carbonaceous material, entirely of turnings, cast iron borings, and carbonaceous material, or entirely of a mixture as described of some solid scrap in the bottom of the bucket and turnings, borings, loose and bulky ferrous scrap and carbonaceous material.

When a large briquette of 50 or more tons is charged into an electric furnace it has been found advisable to first place upon the floor of the furnace a small cushioning charge of about 4 tons of crushed turnings with an appropriate amount of limestone. This cushioning charge is dropped on the floor of the furnace without being briquetted and because of its compressibility absorbs most of the shock which would otherwise be transmitted to the furnace bottom when the large briquette is discharged from the bucket.

From the foregoing description of my process, it is evident that I obtain new and heretofore unobtainable savings in electric current by employing a charge, a large proportion of which is already in a molten condition and the remainder of said charge being in a highly heated condition. I also obtain great savings in time by using a very large briquette which occupies at least substantially half the capacity of the furnace and constitutes substantially the entire solid charge of the furnace whereby the charging operation can be completed in one step and within the span of a very few moments. Great savings in time and heat resulting in increased output are also obtained as a result of the very rapid removal of carbon from the cupola metal.

The iron oxide which may be used in my process includes mill scale, scarfings or drippings from cutting torches, and iron ore, preferably low silica ore.

The scrap or waste material which may be used to form the large briquette include machine shop turnings whether they be of alloy steel or plain carbon steel, cast iron borings, mill scale or scarfings whether they be alloy-free or alloy-contaminated, pit scrap and solid heavy intermill scrap.

Although my invention is particularly concerned with the electric furnace steel making art, I do not intend that my process or any novel part thereof cannot be advantageously used in related steel making arts.

Various changes and modifications may be made in the embodiments of my invention described herein without departing from the scope of the invention as described by the following claims.

Having described the invention, what is claimed as new and desired to be secured by Letters Patent is:

1. The method of producing low carbon steel from steel scrap and molten metal in an electric furnace which comprises intermingling steel scrap and iron oxide to form of such materials a relatively dense mass penetrable by molten metal and throughout which the iron oxide is distributed, which mass includes substantially all of the solid material of a single furnace charge and likewise constitutes one third or more, by weight, of such charge, introducing such mass of solid material as an entirety into the furnace chamber, introducing into the furnace chamber the remainder of the charge, comprising a molten body of metal of relatively high carbon content so as to form, on the bottom of the furnace chamber at the base of the solid charge, a pool of metal having a relatively low melting point, and immediately thereafter establishing an electric arc in the furnace chamber to quickly cause the scrap to melt and the iron oxide to react with the carbon of the molten metal.

2. The method of producing low carbon steel from scrap and molten metal in an electric furnace which comprises intermingling highly heated steel scrap and iron oxide to form of such materials a relatively dense, hot mass penetrable by molten metal and throughout which the iron oxide is distributed, which mass includes substantially all of the solid material of a single furnace charge and likewise constitutes one third or more, by weight, of such charge, introducing such hot mass of solid material as an entirety into the furnace chamber, introducing into the furnace chamber the remainder of the charge, comprising a molten body of metal of relatively high carbon content so as to form, on the bottom of the furnace chamber at the base of the solid charge, a pool of metal having a relatively low melting point, and immediately thereafter establishing an electric arc in the furnace chamber to quickly cause the heated scrap to melt and the iron oxide to react with the carbon of the molten metal.

3. The method of producing low carbon steel from steel scrap and molten metal in an electric furnace which comprises intermingling highly heated steel scrap and iron oxide and forming such materials into a relatively dense, hot self-sustaining briquette, penetrable by molten metal and throughout which the iron oxide is distributed and which briquette includes all of the solid material for a single furnace charge and constitutes one third or more, by weight, of such charge, introducing such hot briquette into the furnace chamber, thereafter introducing into the furnace chamber the remainder of the charge, comprising a molten body of metal of relatively high carbon content so as to form on the bottom of the furnace chamber and at the base of the briquette, a pool of metal having a relatively low melting point, and immediately thereafter establishing an electric arc in the furnace chamber to quickly cause the heated briquette to melt and the iron oxide to react with the carbon of the molten metal.

4. The method set forth in claim 1 in which the relatively dense penetrable mass of scrap and iron oxide comprises approximately one half of the furnace charge, by weight, and the molten high carbon metal constitutes the remainder.

5. The method of producing low carbon steel from steel scrap and molten metal, in an electric furnace, which comprises depositing upon the floor of the furnace chamber, as a single dense mass penetrable by molten metal, all of the solid material for a single charge, constituting one third or more, by weight, of such charge, such mass comprising intermingled steel scrap and iron oxide with the iron oxide distributed throughout the mass, introducing into the furnace chamber the remainder of the charge, comprising a molten body of metal of relatively high carbon content so as to form, on the bottom of the furnace chamber at the base of the solid charge, a pool of metal having a relatively low melting point, and immediately thereafter establishing an electric arc in the furnace chamber to quickly cause the scrap to melt and the iron oxide to react with the carbon of the molten metal.

SIDNEY D. WILLIAMS.

REFERENCES CITED

The following references are of record in the file of this patent:

UNITED STATES PATENTS

| Number | Name | Date |
|--------|------|------|
| 935,686 | Prince | Oct. 5, 1909 |
| 975,751 | Conley | Nov. 15, 1910 |
| 1,290,143 | Eppelsheimer | Jan. 7, 1919 |
| 1,477,135 | Lash | Dec. 11, 1923 |
| 1,526,400 | Waldmann | Feb. 17, 1925 |
| 2,146,872 | Wilberz | Feb. 14, 1939 |

FOREIGN PATENTS

| Number | Country | Date |
|--------|---------|------|
| 141,956 | Great Britain | Apr. 29, 1920 |

OTHER REFERENCES

"Making, Shaping, and Treating of Steel," 5th edition, pages 410 and 411. Published in 1940 by the Carnegie-Illinois Steel Corp., Pittsburgh, Pa.